US008857294B2

(12) United States Patent
Brewer et al.

(10) Patent No.: US 8,857,294 B2
(45) Date of Patent: Oct. 14, 2014

(54) ENGAGEMENT CONTROL ASSEMBLY FOR A BI-DIRECTIONAL OVERRUNNING CLUTCH

(75) Inventors: J. Brendan Brewer, Elmira, NY (US); Kelly P. Heath, Corning, NY (US); James E. Palmer, Erin, NY (US); Howard J. Knickerbocker, Elmira, NY (US); John Michael Hasson, Jr., Elmira, NY (US)

(73) Assignee: The Hilliard Corporation, Elmira, NY (US)

( * ) Notice: Subject to any disclaimer, the term of this patent is extended or adjusted under 35 U.S.C. 154(b) by 576 days.

(21) Appl. No.: 12/969,152

(22) Filed: Dec. 15, 2010

(65) Prior Publication Data

US 2012/0152686 A1 Jun. 21, 2012

(51) Int. Cl.
*F16D 41/067* (2006.01)
*F16D 27/12* (2006.01)
*F16D 41/08* (2006.01)
*F16D 27/10* (2006.01)

(52) U.S. Cl.
CPC .............. *F16D 27/10* (2013.01); *F16D 41/088* (2013.01)
USPC ................. 74/650; 192/38; 192/48.2; 192/50

(58) Field of Classification Search
USPC ................................... 192/48.2, 54.52, 38, 50
See application file for complete search history.

(56) References Cited

U.S. PATENT DOCUMENTS

| 6,409,000 | B1 * | 6/2002 | Itoh et al. ........................ 192/39 |
| RE38,012 | E | 3/2003 | Ochab et al. |
| 6,530,447 | B2 | 3/2003 | Seki et al. |
| 6,622,837 | B2 | 9/2003 | Ochab et al. |
| 6,629,590 | B2 | 10/2003 | Ochab et al. |
| 6,834,750 | B2 * | 12/2004 | Baker et al. ..................... 192/44 |
| 7,032,732 | B2 * | 4/2006 | Muramatsu et al. ............ 192/38 |
| 7,938,041 | B1 * | 5/2011 | Shiigi et al. ..................... 74/650 |
| 2004/0182670 | A1 * | 9/2004 | Nojiri et al. ..................... 192/38 |
| 2005/0077137 | A1 * | 4/2005 | Nozaki et al. ................... 192/38 |
| 2007/0170029 | A1 * | 7/2007 | Okada et al. .................... 192/35 |

OTHER PUBLICATIONS

Spring biased roll cage developed and sold by The Hilliard Corporation, prior to the invention date of the present invention, described on pp. 6-7 of the present application and shown n Fig. 1.

* cited by examiner

*Primary Examiner* — Richard M. Lorence
*Assistant Examiner* — Stacey Fluhart
(74) *Attorney, Agent, or Firm* — Drinker Biddle & Reath LLP

(57) ABSTRACT

A bi-directional overrunning clutch differential for controlling torque transmission between a pinion input shaft and at least one output hub. The clutch having a clutch housing and the roll cage mounted within the housing. An engagement control assembly is provided for controlling the relative position of the roll cage with respect to a cam surface on the clutch housing. The engagement control assembly includes an electronically controlled actuation device, such as a coil or solenoid, which when activated causes the roll cage to rotate into a second position relative to the clutch housing to engage the rolls with the cam surface and an outer surface of the hub. A spring is engaged with the clutch housing and has an end engaged with the roll cage for biasing the roll cage into a neutral position when the roll cage is in its second position.

21 Claims, 16 Drawing Sheets

ENGAGEMENT CONTROL ASSEMBLY FOR A BI-DIRECTIONAL OVERRUNNING CLUTCH

FIELD OF THE INVENTION

The present invention is directed to clutches and, more particularly, an engagement control assembly for a bi-directional overrunning clutch for controlling engagement and disengagement of the clutch.

BACKGROUND OF THE INVENTION

In recent years bi-directional overrunning clutches have been incorporated into various drive systems to replace conventional differentials. Conventional differentials include: open, limited slip, locking and center differentials. U.S. Pat. No. RE38,012, commonly owned by the assignee of the present invention, describes a bi-directional overrunning clutch for controlling torque transmission between a secondary drive shaft and secondary driven shafts. This transmission system is beneficial in four wheel drive vehicles where it is desirable to be able to engage and disengage the secondary driven shafts in different driving environments. The system described in U.S. Pat. No. RE38,012 includes an innovative system to advance and/or retard a roll cage, thereby controlling the ability of the differential to engage and disengage depending on the operational state of the primary and secondary wheels. The system includes an electro-mechanical device, which in one embodiment is an electrically controlled coil adjacent to an armature plate that is engaged with the roll cage and rotates in conjunction with the roll cage. When the coil is energized, an electromagnetic field is produced which hinders the rotation of the armature plate, thus causing the roll cage to drag or advance into an appropriate position relative a clutch housing.

The differential in U.S. Pat. No. RE38,012 also includes a unique backdrive system. The backdrive system actively engages the secondary shafts in certain situations where extra traction is needed. For example, when the vehicle is driving down a slope the system engages the front wheels, which are the wheels with the better traction.

U.S. Pat. No. 6,622,837, commonly assigned to the assignee of the present invention, describes a differential system that includes a bi-directional overrunning clutch with automatic backdrive capability. In this system, an electromagnetic device is used to engage an armature plate that is keyed into the roll cage through tangs. Energizing of the electromagnetic device attracts the armature plate causing it to drag the roll cage, thereby placing the clutch in the activated position for four wheel drive. In another embodiment, a hydraulic piston engages the roll cage causing it to drag.

U.S. Pat. No. 6,629,590, commonly assigned to the assignee of the present invention, describes a spring assembly for a roll cage in a bidirectional overrunning clutch. The spring assembly includes multiple H-clip springs mounted to the roll cage with each H-Clip spring comprising a bridge with spring arms mounted in each end of the bridge and positioned in a slot of the roll cage. The spring arms function to bias the rolls into the center of the slot, the result is the H-clip springs provide a spring force to bias the roll cage into its neutral position. The configuration of the springs also are designed to overcome manufacturing tolerances so as to result in all the rolls engaging at the same time.

An alternate roll cage spring adjustment assembly has been developed by the assignee of the present invention and on the market for a few years. The roll cage and spring adjustment assembly is illustrated in FIG. 1 and includes a roll cage assembly with a plurality of rolls 2 mounted within slots in a roll cage 1. The roll cage assembly is mounted within a clutch housing 3 as described in U.S. Pat. No. 6,629,590. An actuation system with a coil (not shown) and armature plate 4 was mounted to the clutch housing 3 for controlling rotation of the roll cage into its four wheel drive operating mode. The operation of the coil and armature plate was similar to the system described in U.S. Pat. Nos. RE38,012 and 6,629,590. In order to bias the roll cage into its neutral position, the system included a torsion spring 5 that was mounted to an end of the roll cage 1. The spring includes two radially extending arms 6 that projected past the outer circumference of the roll cage 1. When the roll cage was mounted within the clutch housing 3, the arms 6 projected outward and through a slot 7 cut into the clutch housing 3. The arms seated against the radial faces 8 on the circumferential ends of the slot 7. As such, any rotation of the roll cage relative to the clutch housing would cause the arms 6 to bear into the faces 8, thus deforming the torsion spring. This resulted in the torsion spring to bias the roll cage back to its neutral position.

A need still exists for an improved engagement system that provides consistent activation of the clutch while preventing inadvertent engagement and undesirable wedging.

SUMMARY OF THE INVENTION

The present invention relates to a bi-directional overrunning clutch differential for controlling torque transmission between a pinion input shaft and at least one output hub. The differential includes a differential housing; with an input shaft having an end rotatably disposed within the differential housing. At least a portion of the output hub is rotatably disposed within the differential housing. The output hub has an outer surface.

A clutch is disposed within the differential housing and is adapted to control torque transmission between the input shaft and the output hub. The clutch includes a clutch housing engaged with the end of the input shaft, preferably through a gear arrangement, so as to permit transmission of rotational motion from the input shaft to the clutch housing. The clutch housing has an inner surface with a cam surface formed on it. The end of the hub is located radially inward from the cam surface.

A roll cage is located radially between the inner cam surface and the end of the hub. The roll cage has a plurality of slots formed in and spaced circumferentially about the roll cage. Each slot has a roll located in it. The cage is rotatable about its axis relative to the clutch housing and the end of the hub. The roll cage has a first rotational position where the roll cage is positioned relative to the clutch housing such that a plurality of the rolls are not engaged with either the inner cam surface of the clutch housing or the outer surface of the hub; or neither of them, so that substantially no torque can transfer from the clutch housing to the hub through the rolls. The roll cage has a second rotational position where the roll cage is positioned relative to the clutch housing such that a plurality of the rolls are engaged with the inner surface of the clutch housing and the outer surface of the hub so as to permit torque transfer between the clutch housing and the hub.

An engagement control assembly is provided for controlling the relative position of the roll cage with respect to the cam surface of the clutch housing. The engagement control assembly includes an electronically controlled device which when activated causes the roll cage to rotate into its second position relative to the clutch housing to engage the rolls with the cam surface and the outer surface of the hub.

A spring is engaged with the clutch housing and has an end engaged with the roll cage for biasing the roll cage into its first position when the roll cage is in its second position.

The electronically controlled device preferably includes an electromechanical device mounted to the differential housing that releasably drags the roll cage into its second position while permitting the roll cage to rotate relative to the housing. The electromechanical device is preferably a coil, a solenoid, or an actuator.

The engagement control assembly preferably includes an armature plate engaged to the roll cage and which has a surface upon which the electromechanical device releasably engages to shift the roll cage.

The roll cage is placed in its second position when it is rotated in either direction relative to the clutch housing. The spring is mounted so as to bias the roll cage into its first position from either rotational second position of the roll cage.

In one embodiment the spring is a torsion spring. The clutch housing may include a groove within which the torsion spring is seated. The torsion spring has two arms formed on its ends that extend radially inward and engage the roll cage.

In one embodiment the clutch housing has a first pin protruding out of one face of the clutch housing and the torsion spring has a shape that is substantially circular with two ends that overlap one another, each end having an arm that extends radially inward or outward so as to form a gap between the radial arms. The radial arms engage a second pin connected to the roll cage such that rotation of the roll cage relative to the clutch housing causes the second pin to urge one arm to rotate relative to the other, the non-rotating arm bearing against the first pin.

In one embodiment the engagement control assembly includes an adapter disposed about at least a portion of the roll cage and that rotates with the roll cage such that as the roll cage is rotated by actuation of the electronically controlled device, the adapter also rotates. One end of the spring is in biasing engagement with a portion of the adapter such that rotation of the adapter deflects or compresses the spring causing the spring to apply a biasing force against the adapter urging it to rotate in the opposite direction.

In one embodiment the clutch housing has a first pin protruding out of one face of the clutch housing and the spring has two ends, one end engaging the pin on the clutch housing and the other end engaging a pin on the adapter.

The differential is preferably mounted to a vehicle that includes a primary drive axle and a secondary drive axle with two half shafts, each half shaft having one end engaged with a wheel and the opposite end engaged with the output hub. A control system is provided for activating the electromechanical device to engage the input shaft to the output hub.

It is to be understood that both the foregoing general description and the following detailed description are exemplary and explanatory and are intended to provide further explanation of the invention as claimed.

BRIEF DESCRIPTION OF THE DRAWINGS

For the purpose of the illustrating the invention, the drawings show a form of the invention which is presently preferred. However, it should be understood that this invention is not limited to the precise arrangements and instrumentalities shown in the drawings.

DETAILED DESCRIPTION OF THE EMBODIMENTS

Figure 1:
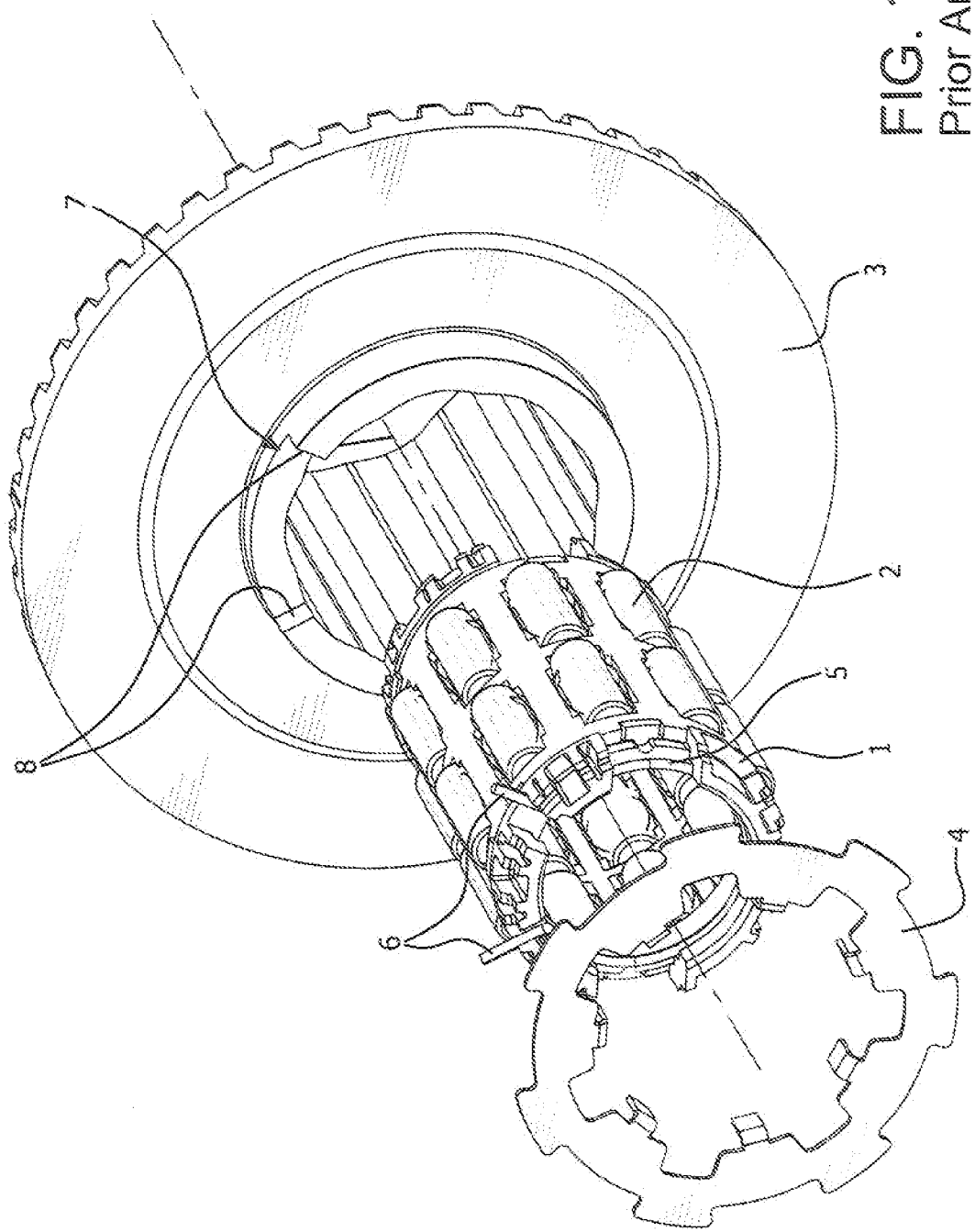
FIG. 1 is an exploded perspective view of a prior art system for biasing a roll cage in a bidirectional overrunning clutch.
Figure 2:
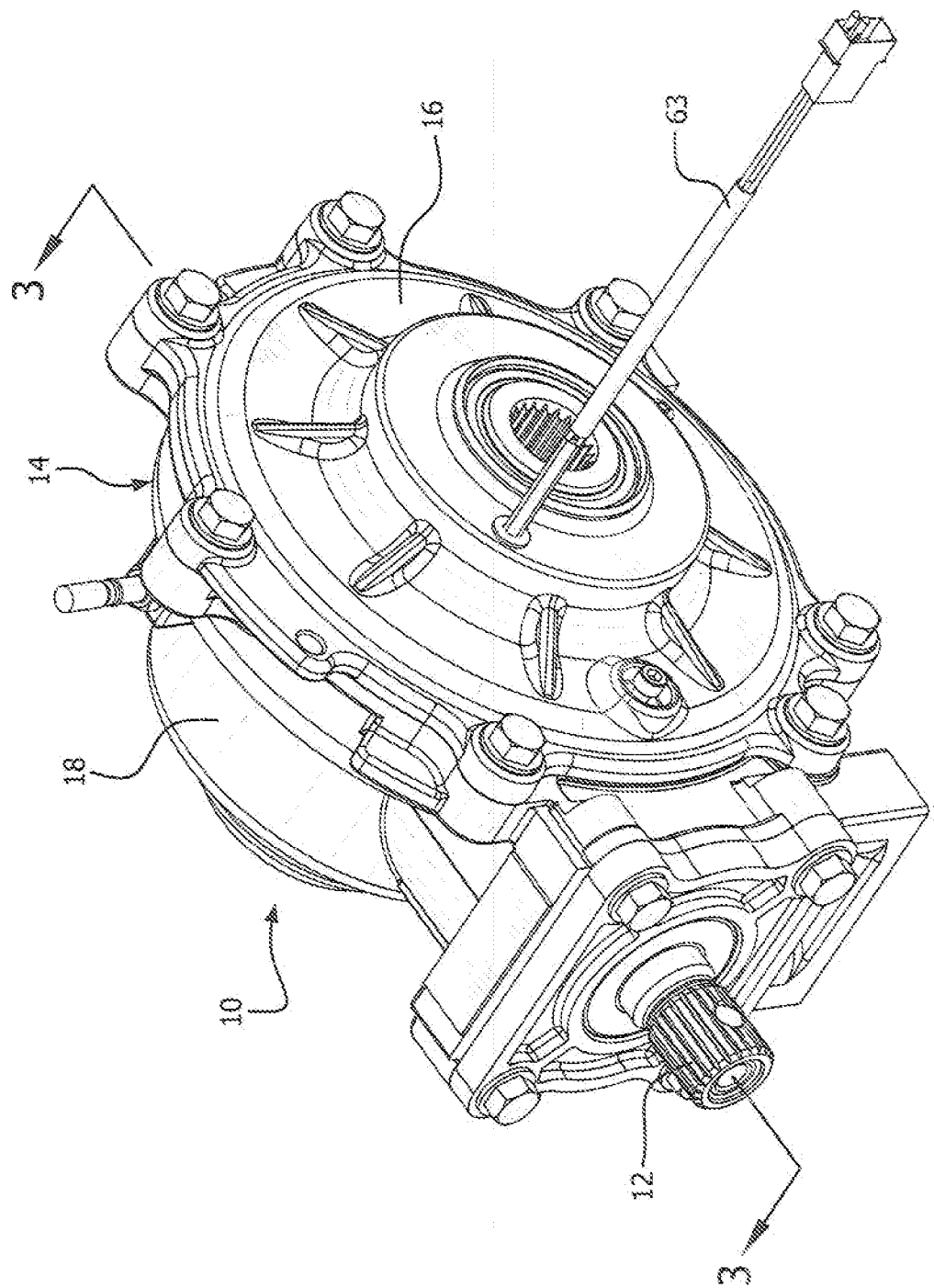
FIG. 2 is a perspective view of a differential with an engagement control assembly according to the present invention.

Referring now to the drawings, wherein like reference numerals illustrate corresponding or similar elements throughout the several views, FIG. 2 is an isometric view of a differential drive 10 according to the present invention for transmitting torque from an input drive 12 to drive axle segments (not shown), such as primary drive axles on a vehicle. The differential includes a housing 14 with two covers or housing portions 16, 18 bolted to one another. The drive axle segments connect to wheels on the vehicle. Each of the axle segments is also connected to a bi-directional overrunning clutch 20 that is located within the housing 14. The connection can be through any conventional means, but is preferably a splined connection.

The bi-directional overrunning clutch 20 is constructed to transfer torque from the input drive 12 to the shaft segments for driving the wheels. As will be apparent from the following discussion, the construction of the clutch 20 facilitates turning of the vehicle by allowing an outer wheel and the associated shaft segment to rotate faster than the inner wheel and associated shaft segment which remain positively driven by the clutch 20. Thus, the clutch 20 permits the outer wheel to independently rotate while the inner wheel continues to drive the machine. The operation of bi-directional overrunning clutches is described in U.S. Pat. Nos. 6,622,837 and RE38,012, which are incorporated herein by reference in their entirety.

Figure 4:
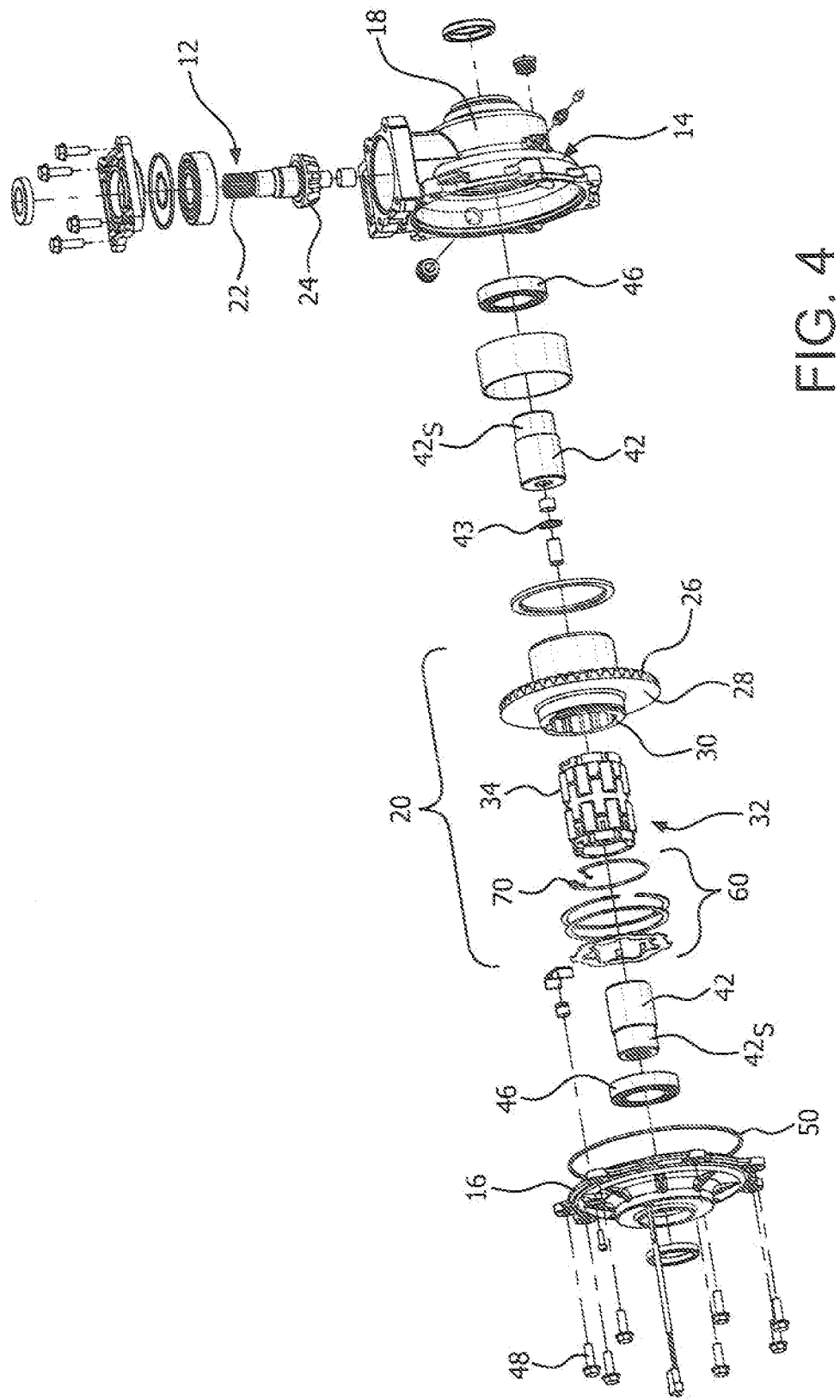
FIG. 4 is an exploded perspective view of the differential of FIG. 2.

FIG. 4 illustrates an exploded view of one embodiment of the differential 10 according to the present invention. The input drive 12 is configured to engage with a drive shaft (not shown), preferably through a splined connection 22. The input drive 12 has a gear 24 on one end that is located within the housing 14. The gear 24 engages with the bi-directional clutch 20. More particularly, the gear 24 engages with gear teeth 26 formed on or attached to a clutch housing 28. As will be well understood by one skilled in the art, the teeth on gear 24 are adapted to engage cooperatively with the gear teeth 26 formed on the clutch housing 28 for transmitting rotation from the drive shaft 12 to the clutch housing 28.

The clutch housing 28 includes an inner cam surface 30 for transferring rotation of the clutch housing 28 to other components of the differential as will be described in greater detail below.

Figure 5:
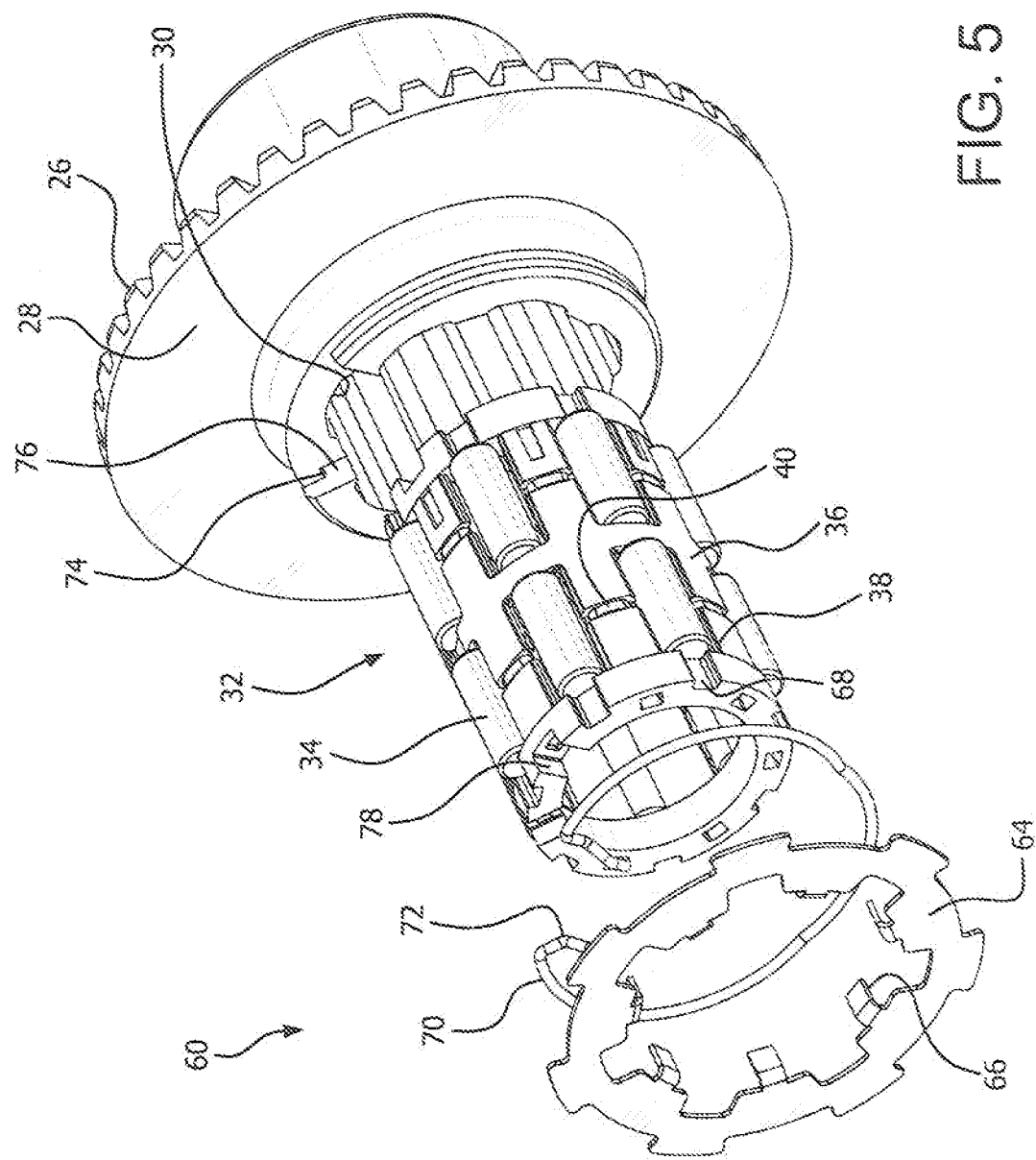
FIG. 5 is an exploded perspective view of one embodiment of an engagement control assembly according to the present invention.

Referring to FIG. 5, the clutch 20 further includes a roller assembly 32 having rolls or rollers 34 arranged in two sets, preferably of seven rollers each, although other numbers of rollers can and have been used in the present invention. The roller assembly 32 also includes a roll cage 36 for rotatably supporting the rollers 34. The roll cage 36 includes spaced slots or recesses 38 formed on opposite sides or ends of the cage 36. The slots 38 are sized to receive the rollers 34.

The roller assembly 32 includes a plurality of springs 40 such as H-clip springs, C-clip springs, or leaf springs. Various springs configurations are described in U.S. Pat. Nos. 6,722,484 and 6,629,590, which are incorporated herein by reference in their entirety. The springs position the rollers 34 in the slots 38. For easy assembly the springs 40 are preferably H-springs that clip onto the roller cage 36 so as to position the spring arms inside the slots 38. As seen in FIG. 5, the arms for each of the spring clips 40 are received in adjacent slots 38 with a bridge portion located in a slot in the roll cage outer surfaces. The configuration of the spring clips in the roll cage is similar to the construction shown and described in U.S. Pat. No. 6,629,590 and, thus, no further discussion is needed. The springs account for tolerances in the manufacturing of the various components so that the rollers all engage at the same time.

Figure 3:
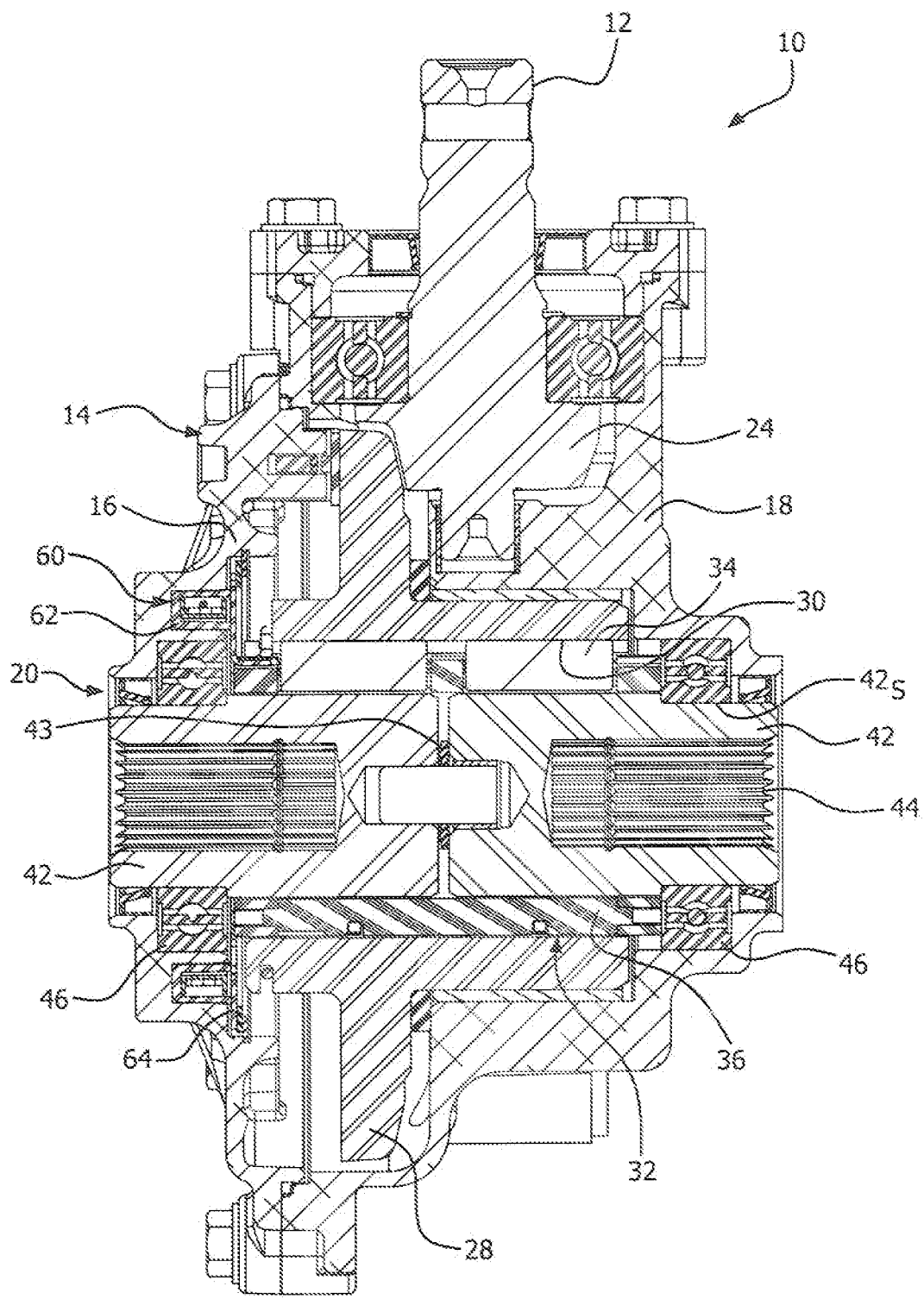
FIG. 3 is a cross-sectional view of the differential of FIG. 2 taken along lines 3-3.

The clutch 20 further includes hubs 42 having splines 44 (shown in FIG. 3) formed on an inner surface thereof for receiving splined ends of the shaft segments. Of course, the hub may instead include a stub shaft portion with outer splines for engaging with inner splines on a shaft segment. Other types of well known connections can be substituted for the illustrated splines. Alternatively, the hubs can be formed integral with the shaft segments. The splined connection secures the hubs 42 to the shaft segments such that each of the hubs 42 rotates in combination with one of the shaft segments. As best seen in FIG. 3, the hubs 42 are received within the interior of the roll cage 36 such that rollers 34 are located between the outer surface of the hubs 42 and the inner cam surface 30. A washer or bearing 43 may be located between the hubs 42 to facilitate relative rotation between the two hubs 42. The washer 43 can be made of any suitable low friction material or may be a roller or thrust bearing. Other types of components can also be used.

Each of the hubs 42 may include a stepped portion $42_S$ with a reduced diameter about which a roller bearing 46 is mounted for supporting the hub and permitting the hub to rotate relative to the differential housing 14. A plurality of bolts 48 seal the housing portions together. An O-ring 50 is preferably included between the housing portions.

An engagement control assembly 60 is located within the housing 14 for controlling the engagement and disengagement of the bi-directional overrunning clutch 20 as will be discussed in more detail below. In one embodiment, the engagement control assembly 60 includes an electromechanical device 62, such as a coil, solenoid or other electrically controlled mechanism, that engages, attracts or otherwise retains (either directly or indirectly) an armature plate 64 (shown in FIG. 5). In the embodiment illustrated in FIG. 3, the electromechanical device is depicted as a coil with a wiring harness 63 (shown in FIG. 2) that connects to an electrical switch (not show) for controlling activation of the coil 62. The armature plate is preferably engaged or connected with the roll cage 36 such that the armature plate rotates with the roll cage 36. As shown, the armature plate preferably has at least one and more preferably a plurality of tabs 66 that engage with recessed slots 68 formed in an end of the roll cage 36. (See FIGS. 5 and 6.) Of course there are a number of different ways to engage or connect the armature plate with the roll cage 36 for allowing the two to rotate together. For example, the armature plate could be mounted to the roll cage.

Figure 6:
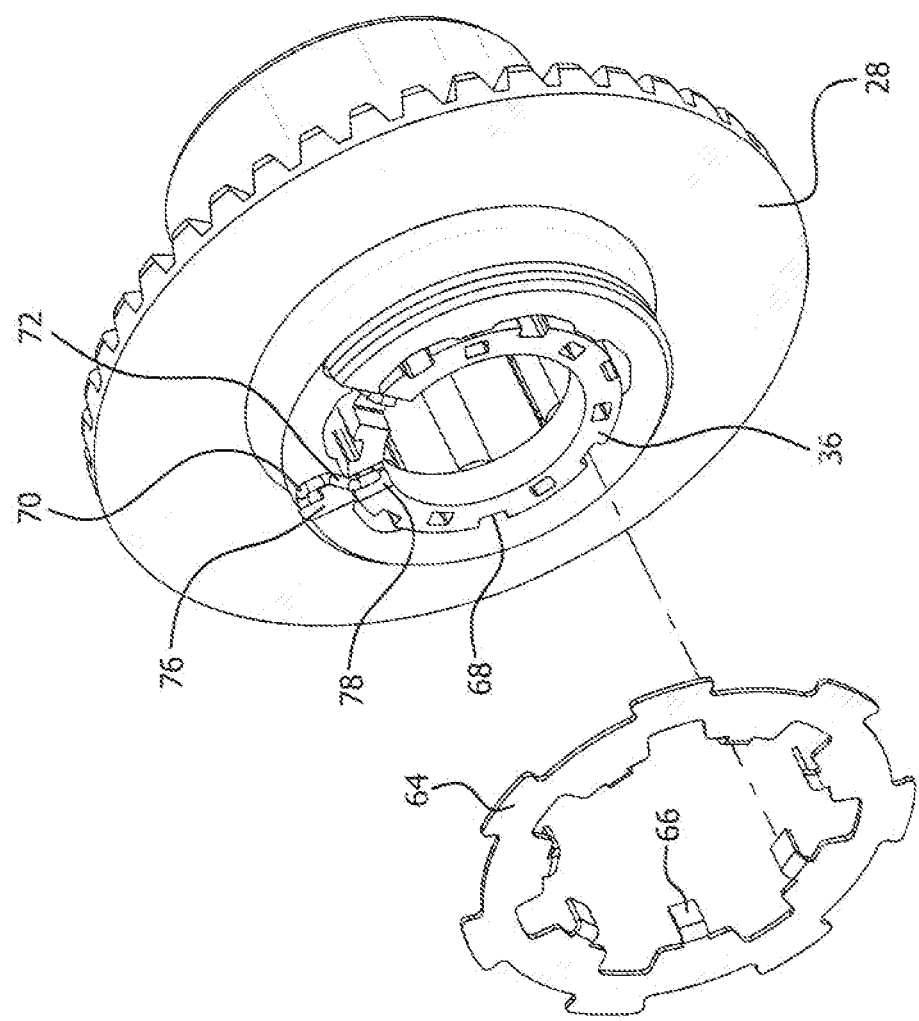
FIG. 6 is the engagement control assembly of FIG. 5 partially assembled.
Figure 7:
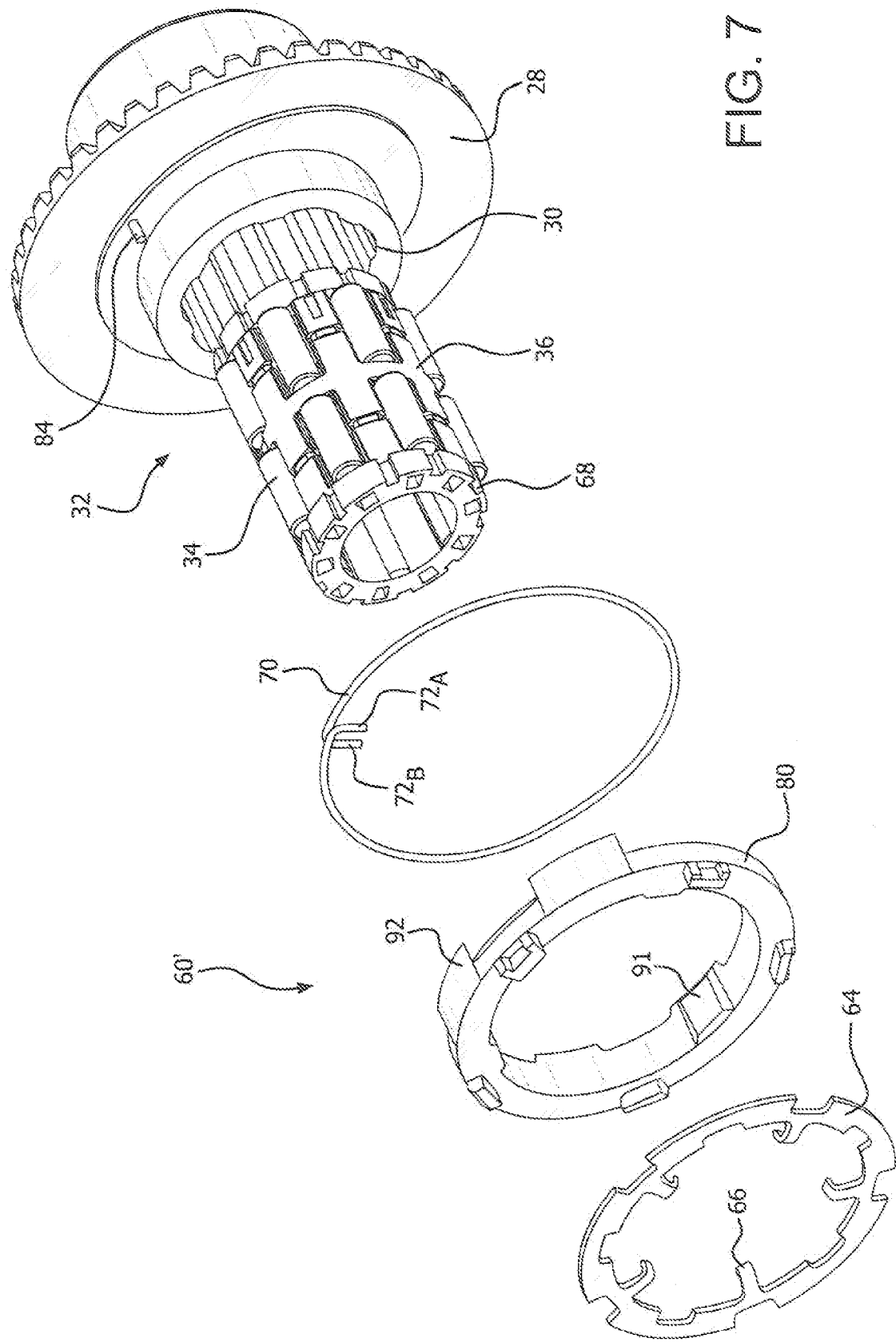
FIG. 7 is an exploded perspective view of another embodiment of an engagement control assembly according to the present invention.
Figure 8:
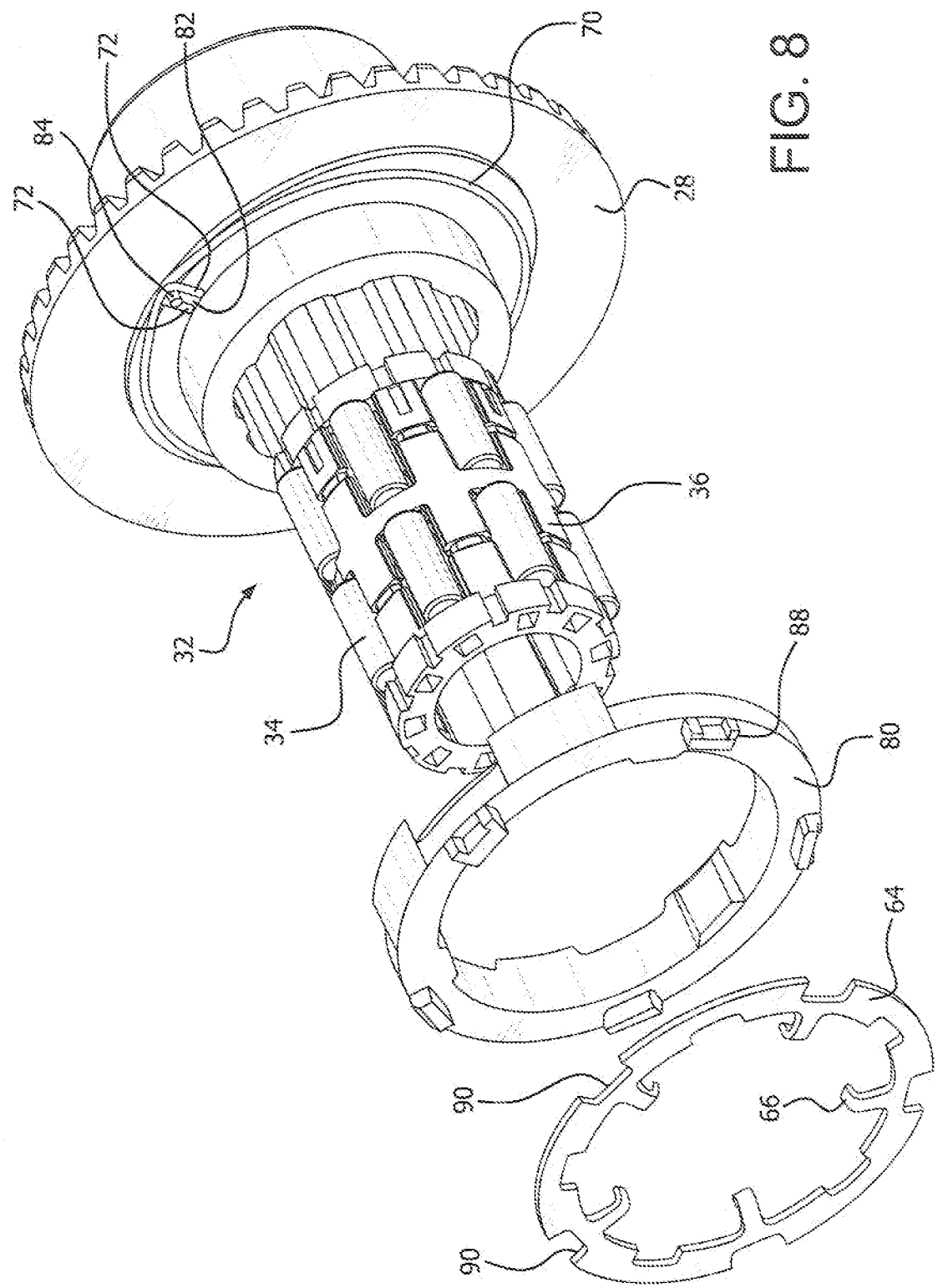
FIG. 8 is the engagement control assembly of FIG. 7 with the torsion spring mounted to the clutch housing.

In order to position the roll cage 36 within the clutch housing 28 so that the rolls 34 are centered within the cam surface 30, the engagement control assembly 60 includes a spring 70 that is designed to bias the roll cage to a neutral position (with the rolls centered in the cam surface 30). In one embodiment shown in FIGS. 5 and 6, the spring 70 is a torsion spring with a shape that is slightly less than circular with two arms 72 that extend radially inward. The torsion spring 70 is mounted to the clutch housing 28. Specifically, the clutch housing 28 has a groove 74 formed in it designed to receive the torsion spring (see FIG. 6). A notch 76 is cut into the housing 28 so as to permit the arms 72 of the torsion spring 70 to extend radially inward past the inner diameter of the housing 28. The arms 72 engage with the roll cage 36. Preferably the roll cage includes one or more spring slots 78 formed in a front face of the cage and designed to receive the arms 72. This is shown in FIG. 6. The arms bear against circumferential faces of the spring slots 78.

The arms 72 of the torsion spring 70 bias the roll cage 36 to the neutral position and against rotation relative to the clutch housing. Specifically, as discussed in more detail below, during actuation, when the roll cage 36 is dragged in either direction so as to cause the roll cage 36 to rotate relative to the clutch housing 28, the faces of the spring slots 78 bear against the arms, causing the torsion spring to deflect. The spring force of the torsion spring acts against the rotation, attempting to return the roll cage to its neutral position.

A single torsion spring provides much tighter tolerance and provides a reliable mechanism for returning the roll cage to its neutral position, preventing unwanted wedging of the rolls between the cam surface and the hub. The torsion spring also prevents premature engagement that could potentially occur in some designs. Also, the use of a torsion spring reduces the need for the roll springs 38, such as the H-clips, to have to be designed to bias the roll cage into a neutral position. Thus, the operational life of the roll springs is increased.

One limitation that exists with the engagement control assembly 60 shown in FIGS. 2-6 is that when the roll cage 36 rotates relative to the clutch housing 28 and the spring 70 deflects, it forces the roll cage 36 off-center with respect to the inner cam surface 30. When this happens the roll cage 36 will potentially scrub on the inner cam surface 30 at a location 180° from the spring slots 78. This scrubbing can hinder the roll cage 36 rotation and lead to delayed engagement of the clutch and all of the rollers 34. Scrubbing can also lead to unequal sharing of torque between all rollers 34, as one set of rollers 34 could engage before the second set. Furthermore, scrubbing can delay the roll cage 36 returning back to the neutral position when the four wheel drive is turned off.

Referring to FIGS. 7-11B, another embodiment of the engagement control assembly 60' is shown which addresses many of the limitations of the first embodiment. In this embodiment, instead of the torsion spring 70 being mounted within a groove in the clutch housing 28, it is position around an external surface of the clutch housing 28. More particularly, the assembly includes an adapter 80 which provides a connection between the torsion spring 70 and the roll cage 36. In this embodiment, the ends of the torsion spring overlap such that the arms 72 on the torsion spring 70 extend past one another defining a gap 82. The torsion spring is placed around a section of the clutch housing such that a pin 84 protruding outward from the clutch housing 28 is captured in the gap 82 with the arms on either side of the pin. See, FIG. 8.

Figure 9:
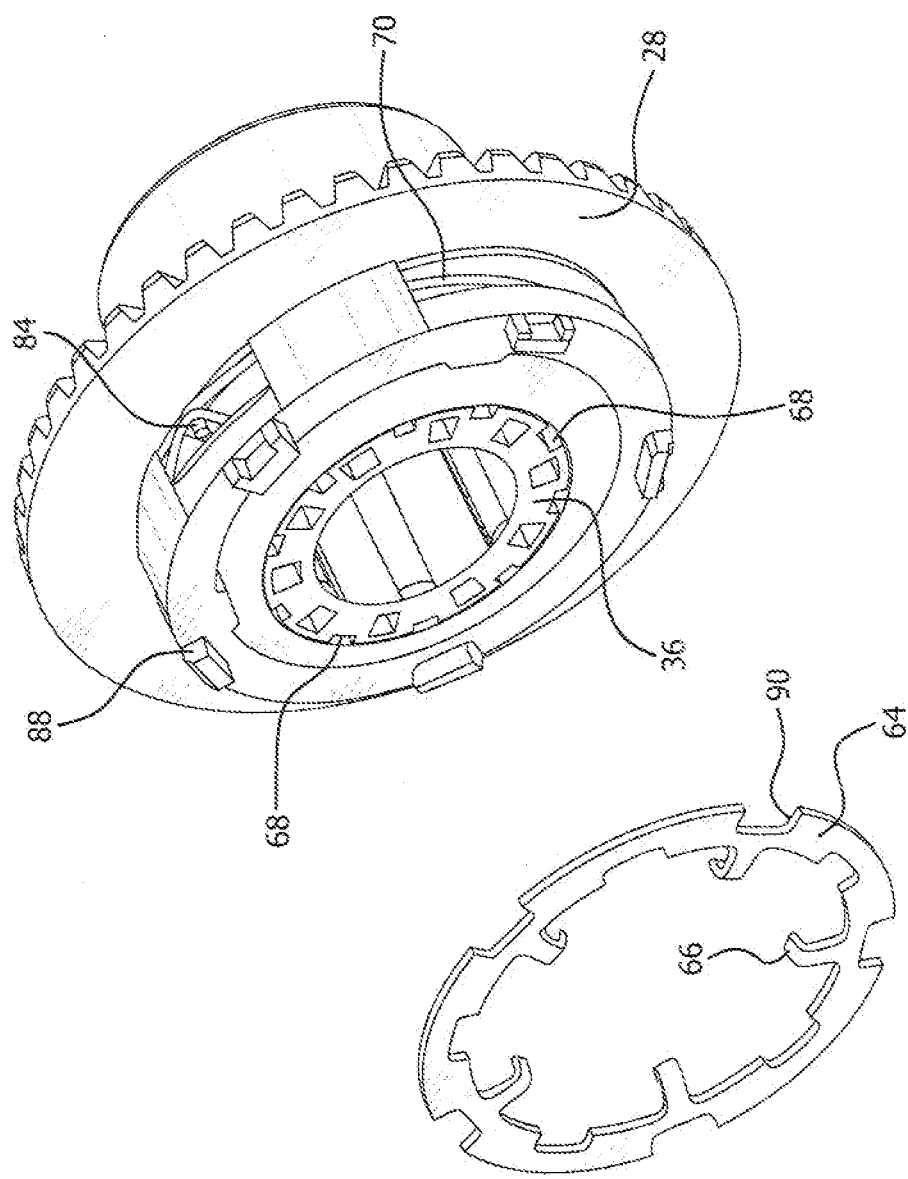
FIG. 9 is the engagement control assembly of FIG. 8 partially assembled.
Figure 11A:
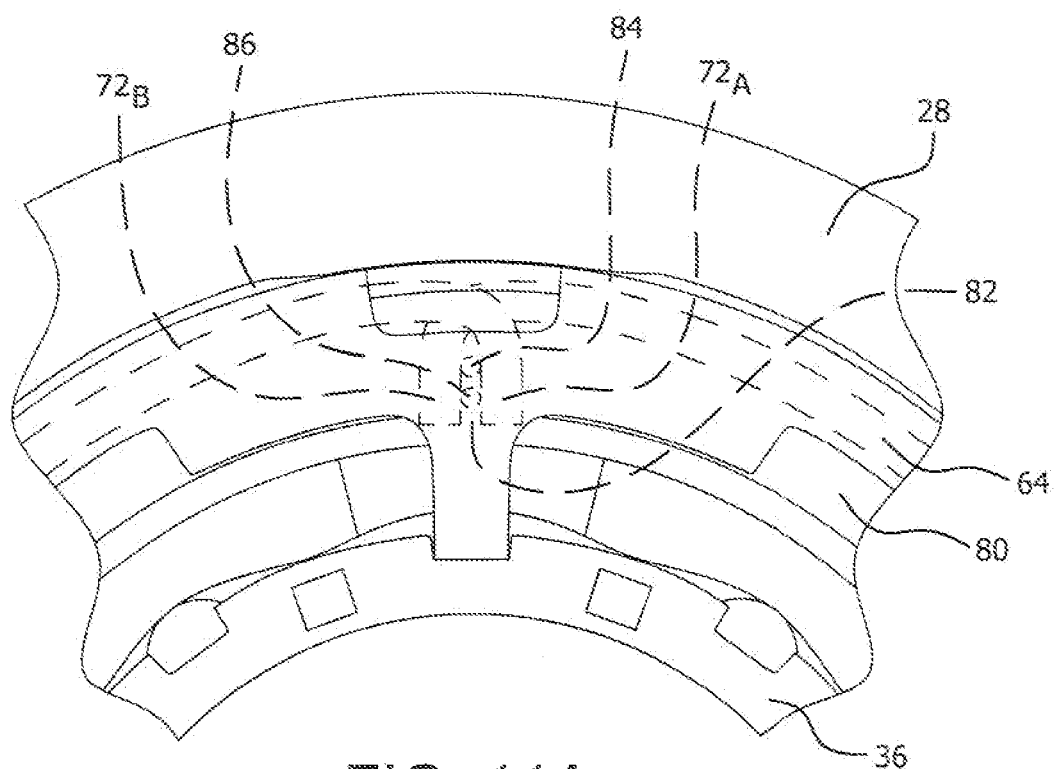
FIG. 11A is an enlarged view of a portion of the assembled engagement control assembly of FIG. 10 in its neutral position.

The adapter or spring retainer 80 has an adapter pin 86 formed on the side of the adapter that faces the clutch housing. With the roll cage 36 positioned within the housing, the adapter 80 is slid onto the clutch housing so that the adapter pin 86 extends into the gap 82 between the arms 72, below the clutch pin 84. This is depicted in FIGS. 9 and 11A. The adapter acts to retain the torsion spring 70 on the clutch housing 28.

Figure 10:
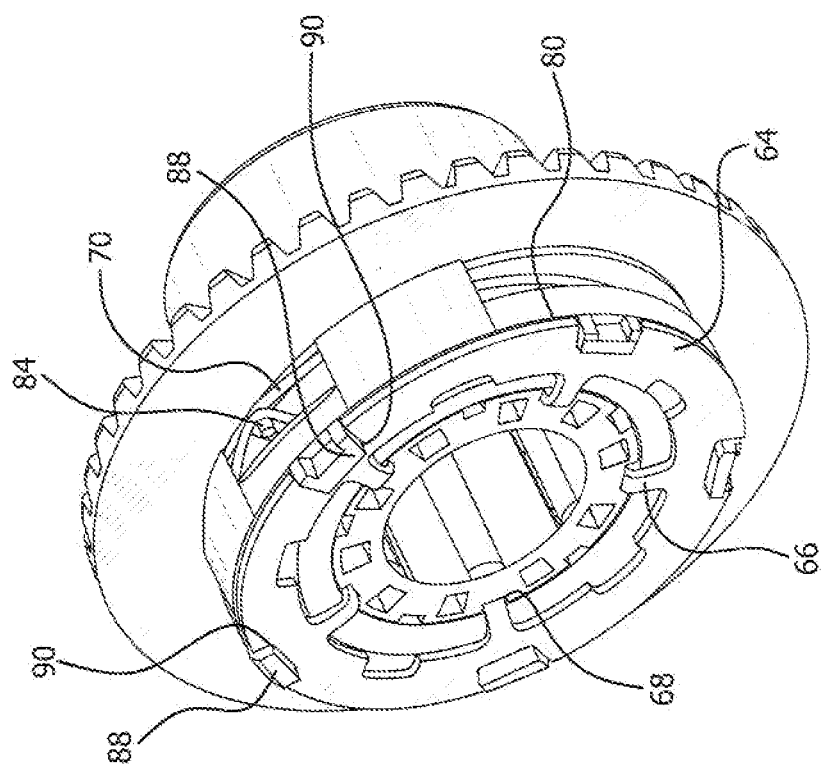
FIG. 10 is the engagement control assembly of FIG. 8 fully assembled.

The adapter 80 has at least one and more preferably a plurality of protruding lugs or tabs 88 that extend out of the opposite side of the adapter from the pin. The lugs 88 are designed to mate with notches 90 formed in the armature plate 64 when the armature plate is placed on the adapter. This is shown in FIG. 10. The mating of the armature plate 64 to the adapter provides a connection between the adapter 80 and the roll cage 36 (which is engaged with the armature plate through the tabs 66 similar to the prior embodiment.) The adapter 80, in turn, is engaged with the torsion spring through the adapter pin 86 contacting the arms 72. As with the prior embodiment, the torsion spring biases the roll cage into its neutral position.

Figure 11B:
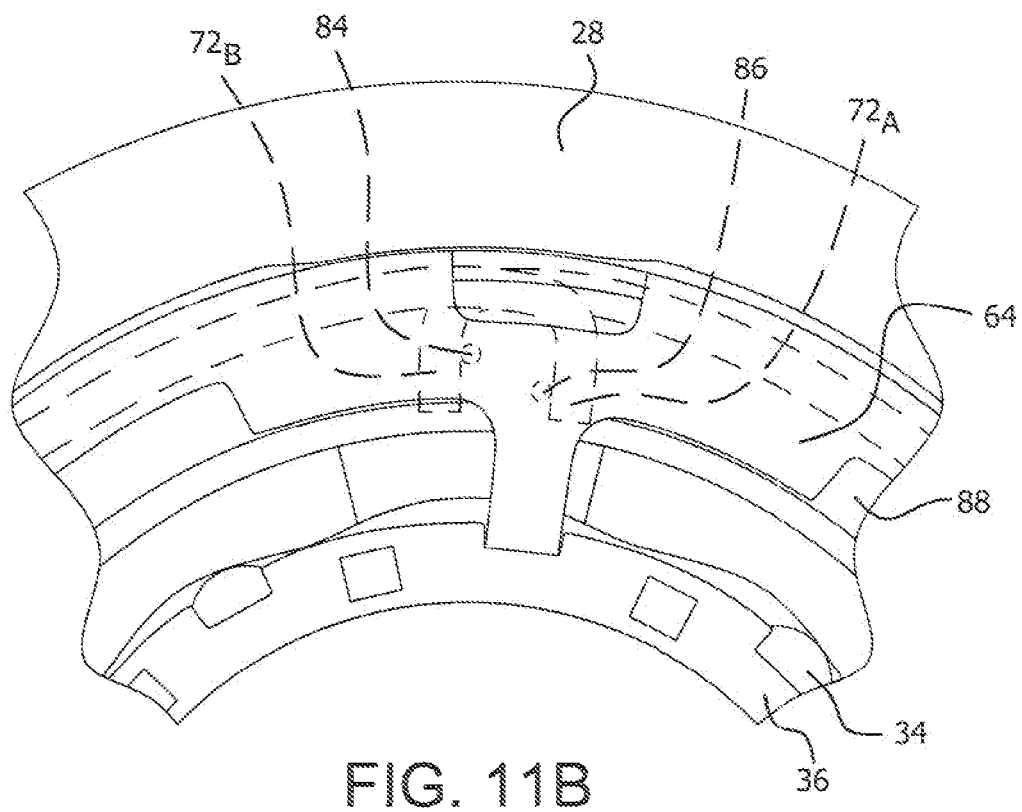
FIG. 11B is an enlarged view of a portion of the assembled engagement control assembly of FIG. 10 in its activated position.
Figure 12:
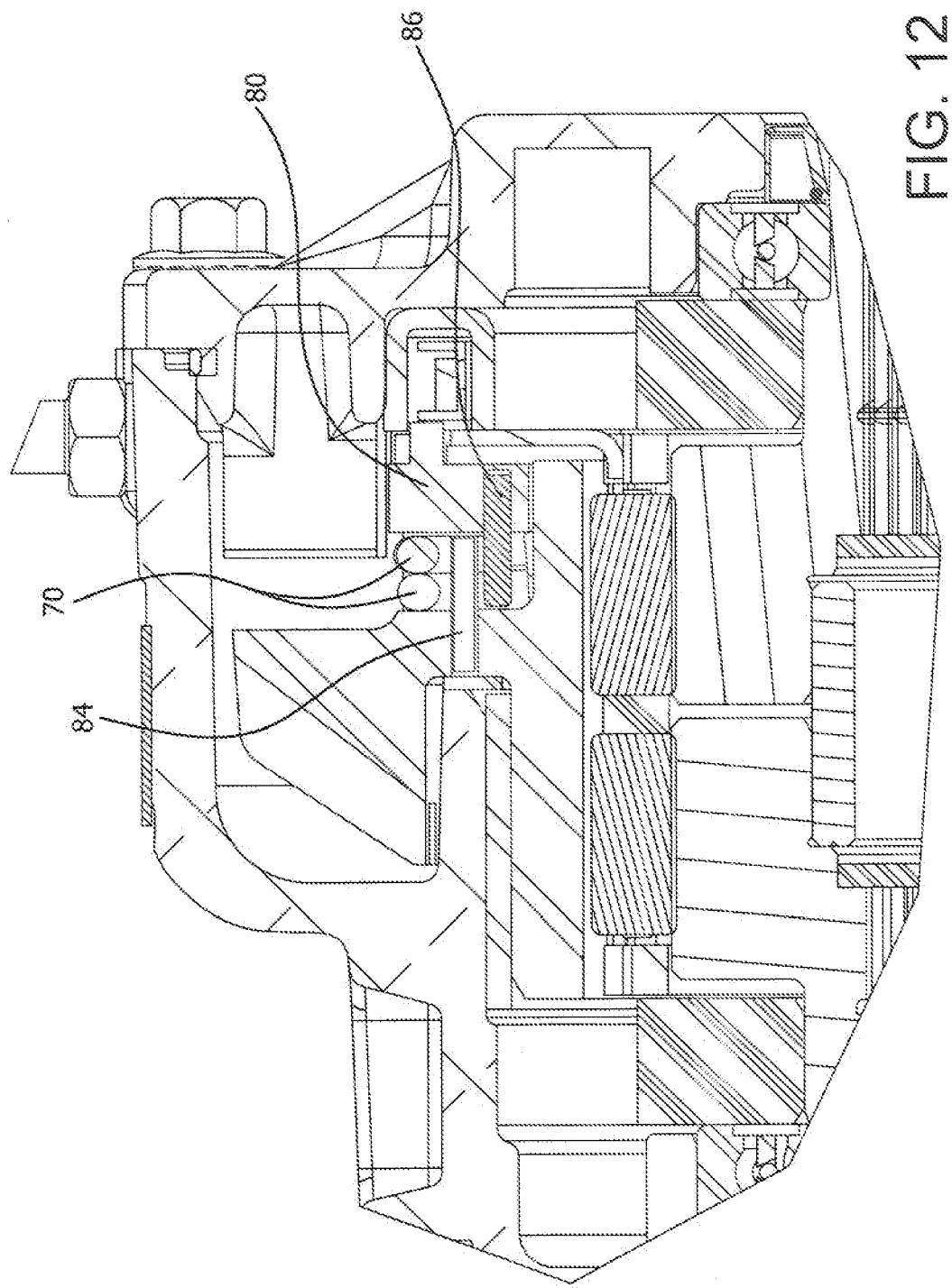
FIG. 12 is a partial cross-sectional view of a differential incorporating the engagement control assembly of FIG. 7.

Referring to FIGS. 11A and 11B, when the electro-mechanical device 62 is energized it hinders the rotation of the armature plate 64, thus hindering the roll cage 36 and adapter 80, which causes the adapter pin 86 to move one of the spring arms 72A away from the other spring arm 72B (which is held stationary by the clutch pin 84.) This movement causes the torsion spring 70 to deflect at which point the spring force of the torsion spring acts against the adapter pin 86 to bias it back toward the clutch pin and the neutral position of the roll cage.

The engagement control assembly 60' shown in FIGS. 7-11B eliminates the above mentioned limitations of the embodiment 60. In this embodiment of the engagement control assembly 60', the torsion spring 70 does not bias roll cage 36 off center. This allows the roll cage 36 to remain centered during engagement and disengagement of bidirectional overrunning clutch 20. Each roll 34 engages or disengages their respective inner cam surface 30 simultaneously providing a more efficient operation. Outer lugs 88 on adapter 80 have a dual function. First they transmit torque from armature plate notches 90 into the lugs 88, which in turn transmit the torque to the torsion spring 70 through pin 86. Second, the adapter 80 centers the armature plate 64 by aligning lugs 88 into armature plate notches 90. The adapter lugs 88 pilot into the engagement control assembly 60. This provides the bidirectional overrunning clutch 20 with consistent torque transfer.

The adapter 80 also includes inner tabs 91 and outer tabs 92. The inner tabs 91 function to pilot the clutch housing 28. This also provides for consistent torque transfer to the bidirectional overrunning clutch 20. The outer tabs 92 provide retention of torsion spring 70. This prevents torsion spring 70 from becoming dislodged and keeps it centered on pin 84 of the clutch housing 28 and pin 86 on the adapter 80. The addition of the torsion spring 70 and adapter 80 allow the roll cage assembly 32 to function with lower yield H-clip springs 40. This permits the H-clip springs 40 to have a lower spring force and stress providing longer life and more consistent operation.

Figure 13:
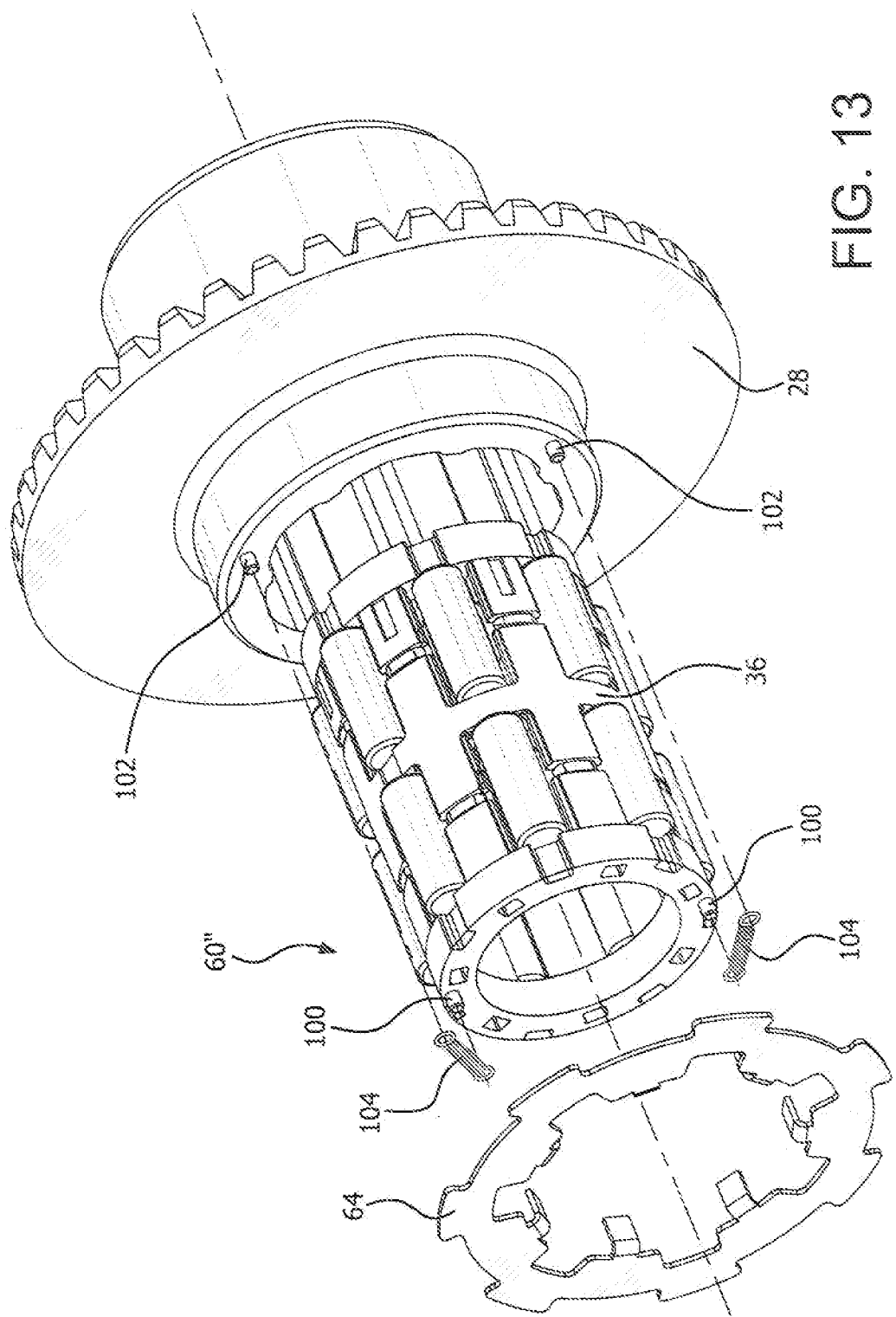
FIG. 13 is an exploded perspective view of another embodiment of an engagement control assembly according to the present invention.
Figure 14:
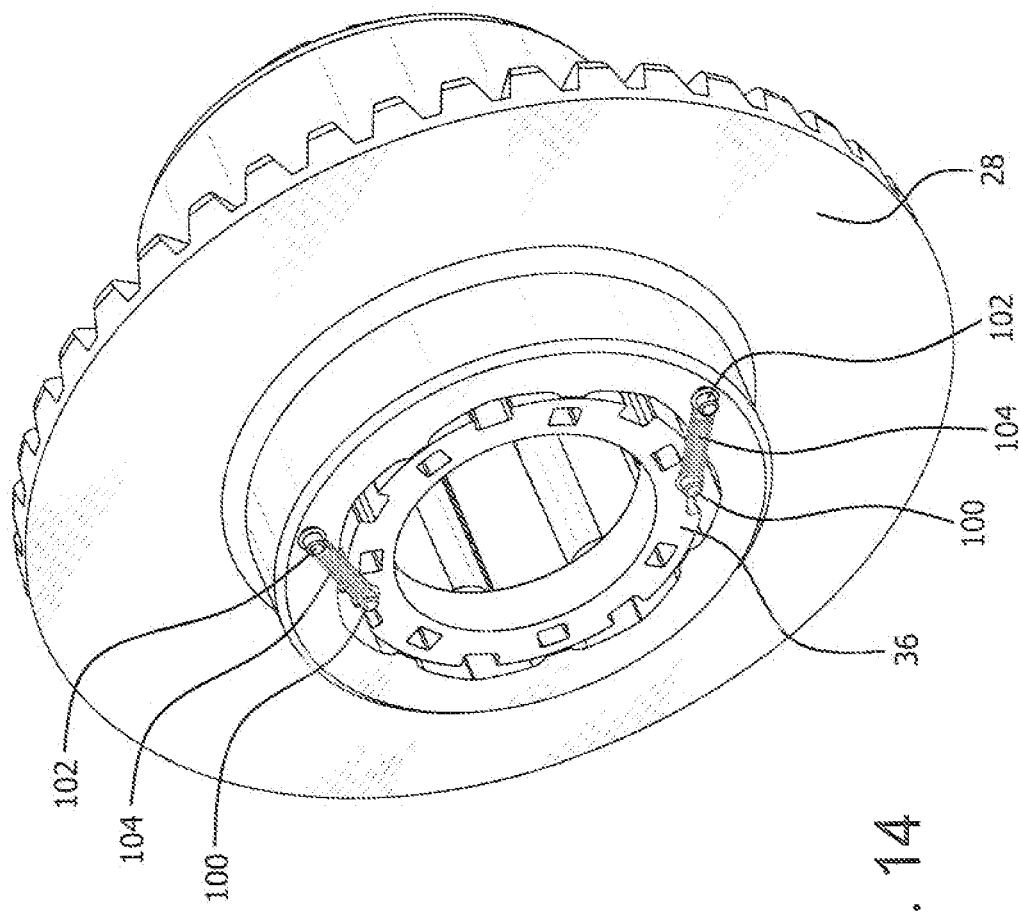
FIG. 14 is a partial assembled view of the engagement control assembly of FIG. 13.

Referring to FIGS. 13 and 14, another embodiment of the engagement control assembly 60" illustrating a different spring assembly for biasing the roll cage 36. FIG. 13 illustrates the engagement control assembly 60" in an exploded view and FIG. 14 illustrates the engagement control assembly 60" assembled (without the armature plate 64.) In this embodiment, the roll cage 36 includes two or more springs and spring mounts 100, which are shown in the illustrated embodiment as pins protruding from the front or end of the roll cage. In the illustrated embodiment, there are two mounts that are preferably located 180 degrees apart on the end of the roll cage so as to provide an even biasing of the roll cage 36 as will become apparent. Corresponding housing mounts 102 are located on the clutch housing 28. In the illustrated embodiment, the housing mounts 102 are depicted as pins protruding from the end face of the clutch housing. Preferably there are an equal number of spring mounts and housing mounts. The housing mounts 102 are not spaced 180 degrees from one another in the illustrated embodiment. The reasons for this is to permit biasing in opposite directions.

Attached to each spring mount 100 and housing mount 102 is a spring 104, which is preferably an extension spring. The spring 104 may be substantially unloaded when the roll cage 36 is in its neutral position, or may be stretched slightly so as the provide an initial biasing, depending on the location of the mounts. As shown, one spring 104 is designed to extend as the roll cage 36 rotates in one direction, while at the same time other spring 104 is preferably configured to contract. It is also contemplated that the housing mounts 102 and/or the spring mounts 100 can be positioned and the springs attached in a variety of different manners such that the roll cage is biased into its neutral position regardless of the direction of rotation of the roll cage 36 relative to the clutch housing 28.

Figure 15:
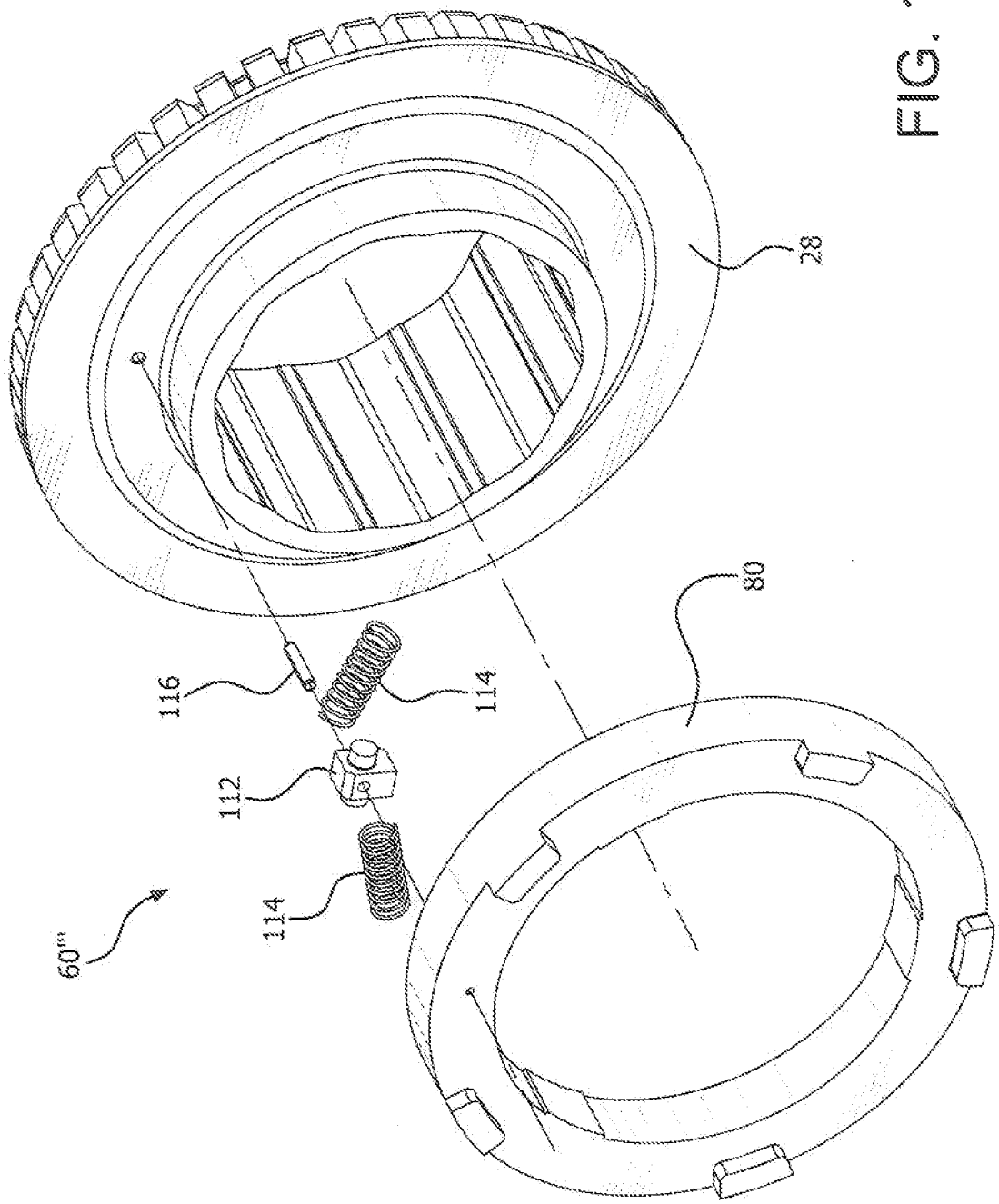
FIG. 15 is an exploded perspective view of another embodiment of an engagement control assembly according to the present invention.
Figure 16:
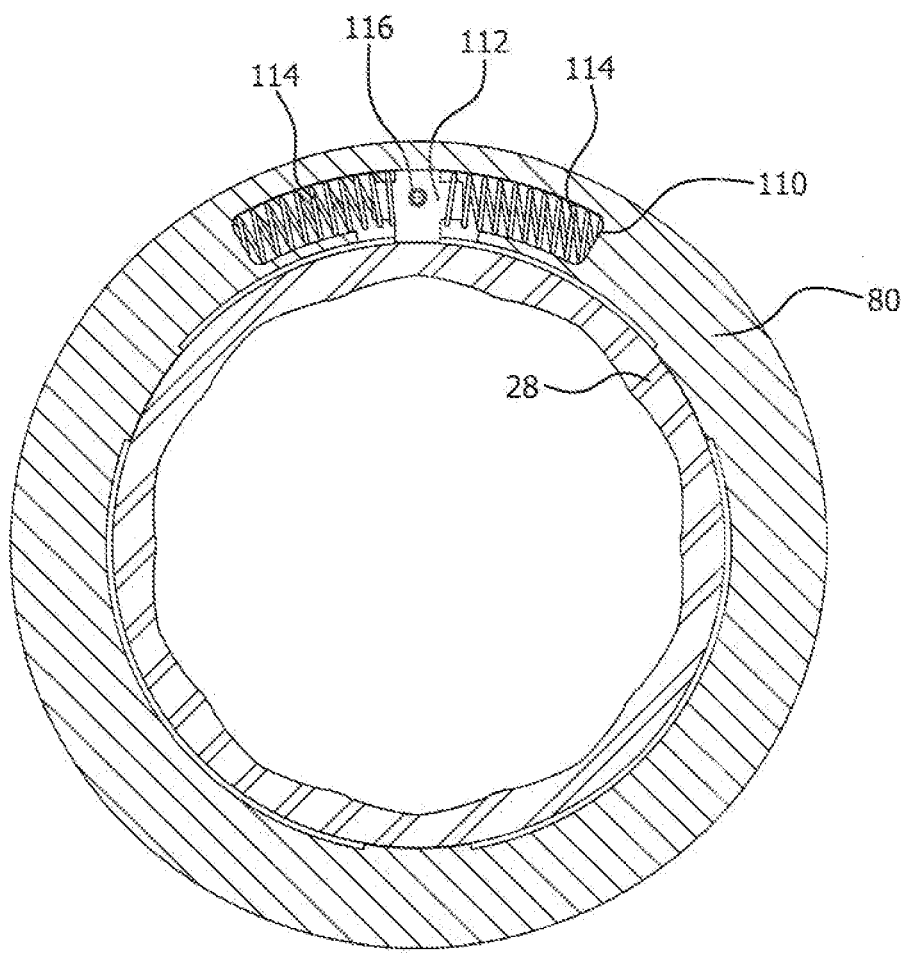
FIG. 16 is a cross-sectional view of the engagement control assembly of FIG. 15.

FIGS. 15 and 16 illustrate another embodiment of the engagement control assembly 60" illustrating another variation of a spring assembly for biasing the roll cage 36. In this embodiment, which is a modification of the adapter embodiment shown in FIG. 7, the adapter 80 has a recess 110 formed on its rear face. A spring mount 112 is positioned within the center of the recess. A spring 114 is positioned on either side of the spring mount 112 with the ends of each spring pressing on one side against a wall of the recess and the other side against the spring mount 112. The spring mount 112 is secured to the clutch housing 28 by a pin 116.

As should be apparent, any rotation of the roll cage (not shown) relative to the clutch housing 28 will result in the adapter rotating at the same time and in the same direction. Since the spring mount 112 is fixed to the clutch housing, the rotation of the adapter 80 will result in one spring 114 compressing and the other either decompressing (unloading) or just remaining stationary as the adapter rotates.

The spring arrangements illustrated and described above are designed to maintain the roll cage centered within the clutch housing (in its neutral position) and not designed to bias the roll cage in any particular direction from center.

Although the present invention has been described and illustrated with respect to the exemplary embodiments thereof, it should be understood by those skilled in the art that the foregoing and various other changes, omissions and addi-

The invention claimed is:

1. A bi-directional overrunning clutch differential for controlling torque transmission between a pinion input shaft and at least one output hub, the differential comprising
a differential housing;
the pinion input shaft having an end rotatably disposed within the differential housing;
the at least one output hub, at least a portion of the output hub being rotatably disposed within the differential housing, the hub having an outer surface;
a clutch disposed within the differential housing and adapted to control torque transmission between the input shaft and the at least one output hub, the clutch including:
a clutch housing engaged with the end of the input shaft in the differential housing so as to permit transmission of rotational motion from the input shaft to the clutch housing, the clutch housing having an inner surface with a cam surface formed thereon, the end of the hub being located radially inward from the cam surface, and
a roll cage located between the cam surface and the end of the hub, the roll cage having a plurality of slots formed in and spaced circumferentially about the roll cage, each slot having a roll located therein, the cage being rotatable relative to the clutch housing and the end of the hub, the roll cage having a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub; and
an engagement control assembly including:
a drag mechanism which engages the roll cage to shift the roll cage into its second position, the drag mechanism including an electronically controlled device for controllably rotating the roll cage relative to the clutch housing;
a spring mounted to the clutch housing and engaging the roll cage for biasing the roll cage into its first position; and
an adapter disposed about at least a portion of the roll cage and engaged with the roll cage through the drag mechanism such that as the drag mechanism rotates the roll cage, it rotates the adapter, and wherein one end of the spring is in biasing engagement with a portion of the adapter such that rotation of the roll cage and adapter stretches or compresses the spring such that the spring applies a biasing force against the adapter urging it to rotate in the opposite direction.

2. A bi-directional overrunning clutch differential according to claim 1 wherein the electronically controlled device is an electromechanical device mounted to the differential housing that releasably drags the roll cage into its second position while permitting the roll cage to rotate relative to the housing.

3. A bi-directional overrunning clutch differential according to claim 2 wherein the electromechanical device is one of a coil, a solenoid, or an actuator.

4. A bi-directional overrunning clutch differential according to claim 2 wherein the drag mechanism includes an armature plate engaged to the roll cage and having a surface upon which the electromechanical device releasably engages, the engagement causing the armature plate to shift the roll cage.

5. A bi-directional overrunning clutch differential according to claim 1 wherein the roll cage is placed in its second position when it is rotated in either direction relative to the clutch housing, and wherein the spring is mounted so as to bias the roll cage into its first position from either rotational second position of the roll cage.

6. A bi-directional overrunning clutch differential according to claim 5 wherein the spring is a torsion spring.

7. A bi-directional overrunning clutch differential according to claim 6 wherein the clutch housing has a groove formed in it within which the torsion spring is seated, and wherein the torsion spring has two arms formed on the ends of the spring that extend radially inward and engage the roll cage.

8. A bi-directional overrunning clutch differential according to claim 7 wherein the torsion spring has a shape that is less than circular such that the arms are spaced circumferentially apart from one another, wherein the clutch housing has a notch formed in it through which the arms extend, and wherein the roll cage has at least one slot formed in one of its end faces into which the arms extend, the slot having a circumferential surface against which each arm bears when the roll cage is rotated relative to the clutch housing.

9. A bi-directional overrunning clutch differential according to claim 6 wherein the clutch housing has a first pin protruding out of one face of the clutch housing and wherein the torsion spring has a shape that is substantially circular with two ends that overlap one another, each end having an arm that extends radially inward or outward so as to form a gap between the radial arms, the radial arms engaging a second pin connected to the roll cage such that rotation of the roll cage relative to the clutch housing causes the second pin to urge one arm to rotate relative to the other, the non-rotating arm bearing against the first pin.

10. A bi-directional overrunning clutch differential according to claim 9 wherein the arms of the torsion spring extend radially inward, and wherein the second pin is located radially inward from the first pin.

11. A bi-directional overrunning clutch differential according to claim 5 wherein the differential is mounted to a vehicle, the vehicle including a primary drive axle, a secondary drive axle with two half shafts, each half shaft having one end engaged with a wheel and the opposite end engaged with the at least one output hub, and a control system for activating the drag mechanism to engage the input shaft to the output hub.

12. A bi-directional overrunning clutch differential according to claim 1 wherein the clutch housing has a first pin protruding out of one face of the clutch housing and wherein the spring has two ends, one end engaging the pin on the clutch housing and the other end engaging a pin on the adapter.

13. A bi-directional overrunning clutch differential according to claim 1 wherein the adapter has at least one protruding lug that extends out of one side of the adapter, wherein the drag mechanism includes an armature plate having a surface upon which the electromechanical device releasably engages, the armature plate has at least one notch formed in it that is designed to mate with the lug when the armature plate is placed on the adapter, and wherein the armature plate is engaged with the roll cage.

14. A bi-directional overrunning clutch differential according to claim 13 wherein the clutch housing has a first pin protruding out of one face of the clutch housing and wherein the spring has two ends, one end engaging the pin on the clutch housing and the other end engaging a pin on the adapter on an opposite side of the adapter from the protruding lug; and wherein the armature plate is directly engaged with the roll cage.

15. A bi-directional overrunning clutch differential according to claim 14 wherein the spring is a torsion spring and wherein one second pin is located radially inward from the first pin.

16. A bi-directional overrunning clutch differential according to claim 15 wherein the adapter includes inner tabs and outer tabs, the inner tabs adapted to pilot the clutch housing, the outer tabs adapted to provide a mechanism for retaining the torsion spring so as to prevent the torsion spring from dislodging and to keep it centered on the pins.

17. A bi-directional overrunning clutch differential according to claim 13 wherein there are a plurality of lugs spaced about the adapter and a plurality of notches on the armature plate, the notches are located on the armature plate so as to centering of the armature plate on the adapter so as to provide consistent torque transfer.

18. A bi-directional overrunning clutch differential for controlling torque transmission between a pinion input shaft and at least one output hub, the differential comprising
    a differential housing;
    the pinion input shaft having an end rotatably disposed within the differential housing;
    at least a portion of the output hub being rotatably disposed within the differential housing, the hub having an outer surface;
    a clutch disposed within the differential housing and adapted to control torque transmission between the input shaft and the at least one output hub, the clutch including:
        a clutch housing engaged with the end of the input shaft in the differential housing so as to permit transmission of rotational motion from the input shaft to the clutch housing, the clutch housing having an inner surface with a cam surface formed thereon, the end of the hub being located radially inward from the cam surface, and
        a roll cage located between the cam surface and the end of the hub, the roll cage having a plurality of slots formed in and spaced circumferentially about the roll cage, each slot having a roll located therein, the cage being movable relative to the clutch housing and the end of the hub, the roll cage having a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub; and
    an engagement control assembly for controlling the relative position of the roll cage with respect to the cam surface of the clutch housing, the engagement control assembly including:
        an electronically controlled device which when activated causes the roll cage to index into its second position relative to the clutch housing to engage the rolls with the cam surface and the outer surface of the hub;
        an armature plate engaged to the roll cage, the armature plate adapted to be releasably engaged by the electromechanical device, the engagement causing the armature plate to index the roll cage;
        an adapter disposed about at least a portion of the roll cage and the armature plate being connected to the adapter so as to provide engagement between the adapter and the roll cage such that the roll cage and the adapter rotate together;
        at least two springs, each spring having a first end mounted to the clutch housing and a second end contacting a portion of the adapter such that, upon the roll cage indexing, the adapter also indexes relative to the clutch housing and thereby deflects or compresses at least one of the springs which, in turn, causes the at least one spring to apply a biasing force against the adapter urging it to index in the opposite direction and thereby urge the roll cage into its first position when the roll cage is in its second position.

19. A bi-directional overrunning clutch differential according to claim 18 wherein the clutch housing has a first pin protruding out of one face of the clutch housing and wherein the first end of each spring engages the pin on the clutch housing.

20. A bi-directional overrunning clutch differential for controlling torque transmission between a pinion input shaft and at least one output hub, the differential comprising
    a differential housing;
    the pinion input shaft having an end rotatably disposed within the differential housing;
    the at least one output hub, at least a portion of the output hub is rotatably disposed within the differential housing, the hub having an outer surface;
    a clutch disposed within the differential housing and adapted to control torque transmission between the input shaft and the at least one output hub, the clutch including:
        a clutch housing engaged with the end of the input shaft in the differential housing so as to permit transmission of rotational motion from the input shaft to the clutch housing, the clutch housing having an inner surface with a cam surface formed thereon, the end of the hub being located radially inward from the cam surface, and
        a roll cage located between the cam surface and the end of the hub, the roll cage having a plurality of slots formed in and spaced circumferentially about the roll cage, each slot having a roll located therein, the cage being movable relative to the clutch housing and the end of the hub, the roll cage having a first position where the roll cage is positioned relative to the clutch housing such that a plurality of the rolls are not engaged with at least one of either the inner surface of the clutch housing or the outer surface of the hub so that substantially no torque can transfer from the clutch housing to the hub through the rolls, and a second position where the roll cage is positioned relative to the clutch housing such that a plurality of the rolls are engaged with the inner surface of the clutch housing and the outer surface of the hub so as to permit torque transfer between the clutch housing and the hub; and an engagement control assembly for controlling the relative position of the roll cage with respect to the cam surface of the clutch housing, the engagement control assembly including:
an electronically controlled device which when activated causes the roll cage to rotate into its second position relative to the clutch housing to engage the rolls with the cam surface and the outer surface of the hub; and
a torsion spring mounted to the clutch housing and having two ends, at least one end of the torsion spring engaging the roll cage for biasing the roll cage into its first position when the roll cage is in its second position;
wherein the engagement control mechanism includes an armature plate engaged to the roll cage and having a surface upon which the electronically controlled device engages when activated to cause the roll cage to move into its second position, and wherein a portion of the spring engages the armature plate thereby providing the engagement of the spring to the roll cage.

21. A bi-directional overrunning clutch differential according to claim 20, wherein the at least two springs comprises a pair of tension springs mounted to the clutch housing and engaging the roll cage in opposite tangential directions for biasing the roll cage into its first position.

* * * * *